HIRSCHY & McDONALD.
Harvester Rake.
No. 63,890.
Patented April 16, 1867.
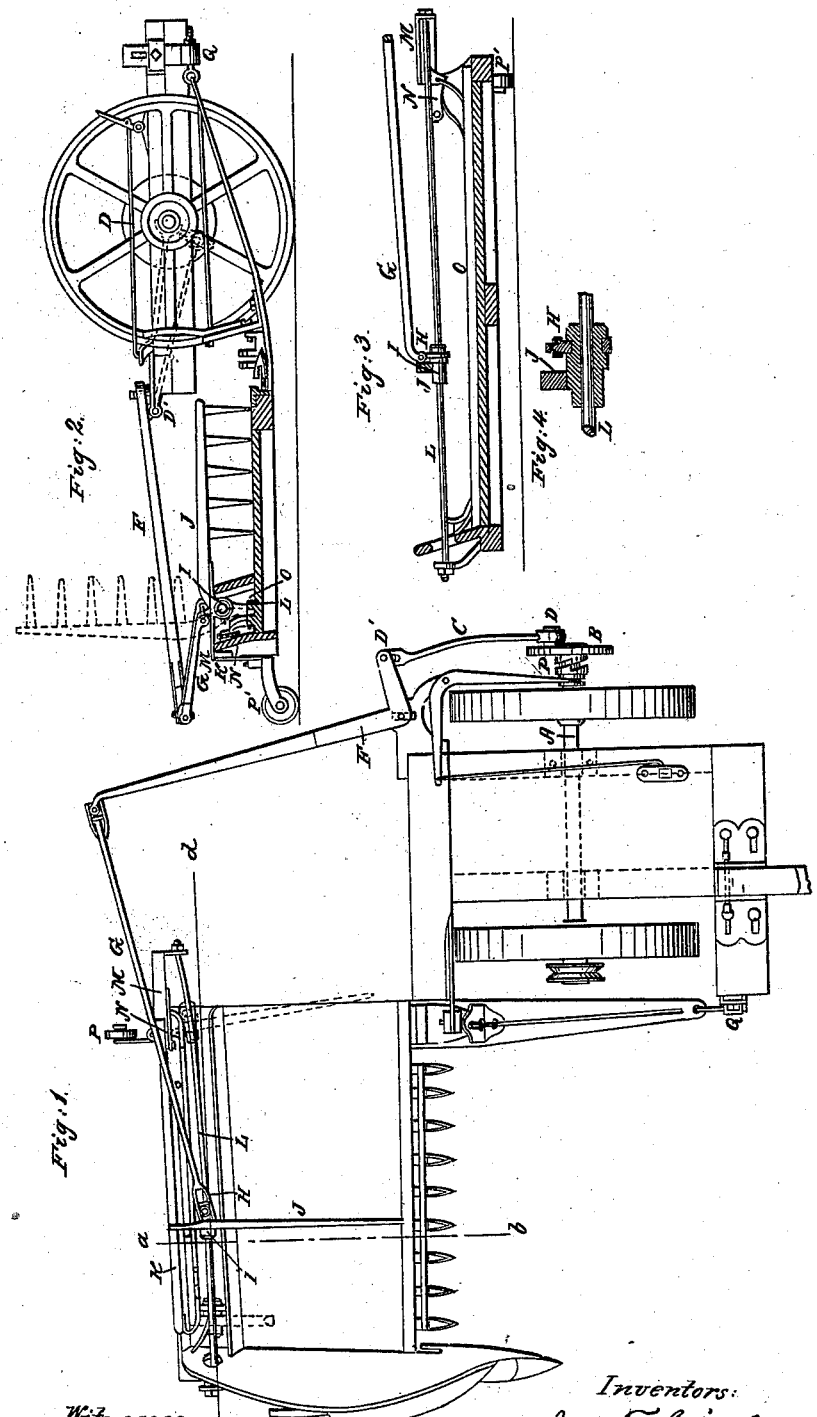

United States Patent Office.

JOHN F. HIRSCHY AND WILLIAM M. McDONALD, OF WOOSTER, OHIO, ASSIGNORS TO THEMSELVES AND A. McDONALD.

Letters Patent No. 63,890, dated April 16, 1867.

IMPROVEMENT IN HARVESTER RAKES.

*The Schedule referred to in these Letters Patent and making part of the same.*

TO ALL WHOM IT MAY CONCERN:

Be it known that we, JOHN F. HIRSCHY and WILLIAM McDONALD, of Wooster, in the county of Wayne, and State of Ohio, have invented an improved Raking Attachment for Harvesters; and we do hereby declare the following to be a full, clear, and exact description of the same, sufficient to enable one skilled in the art to which the invention appertains to make use of it, reference being had to the accompanying drawings, which form a part of this specification, and in which—

Figure 1 is a top or plan view.

Figure 2 is a section on the line $a$ $b$, fig. 1, showing the carriage portion in elevation.

Figure 3 is a section on the line $c$ $d$, fig. 1, looking towards the rear.

Figure 4 is a vertical section of the collar and slide connected with the rake-head.

The attachment of the raking apparatus to the crank or wheel on the outside of the carriage assists in overcoming the side draught by placing the raking arrangement on the opposite side to the platform and partially balancing the draught. The adjustable wrist in the slot of the crank or wheel on the axle permits the adjustment of the length of stroke of the rake. The universal joint at the point of attachment of pitman and rocking-arm permits freedom of motion during changes in the relative position of the carriage and platform in passing over uneven ground. The adjusting device for the fulcrum of the rocking-arm in connection with the adjustability of the wrist permits the exact regulation of the parts. To secure freedom of motion of the parts, universal joints connect the rocking-arm with the connecting-rod, and the latter with the collar on the slide at the but end of the rake-head. During the effective motion of the rake the prong at the heel of the rake-head rests upon a bearing at the rear end of the platform so as to keep the rake down to its work, and when this bearing ceases the rake is prevented from falling below the level of the platform by an upper bearing upon the prong. At this point it passes a latch, which on its return or non-effective stroke carries down the prong, raising the rake-head and leading the prong down until it reaches a rod which preserves the rake-head in a vertical position until it reaches the end of the platform toward the standing grain. The rake-head is prevented from falling back beyond the vertical by a guide rod in front of the prong. The rake-head arriving at the dividing-board, the guides vibrate the rake-head forward by pressure upon the prong, and the rake falls with sufficient force to penetrate the layer of grain ready for another effective stroke. The rod upon which the slide of the rake-head traverses, is curved, causing the rake as it falls upon the platform to assume the direction of the dividing-board, describing the arc of a circle upon the platform, drawing the buts of the grain from the guards of the sickle-bar, and the pitman of the reaper delivering the buts of the grain a little in advance of the heads, as the gavel leaves the platform, the buts in a line at right angles to the line of direction of the reaper and the gavel behind the carriage, a clear space being left between the row of gavels so delivered, and the standing grain, wide enough for the passage of the reaper in its next round. The lever by which the raking apparatus is thrown in and out of gear is within reach of the foot or hand, and when continuously pressed the clutch on the axle engaging with that on the wheel will deliver a sheaf every nine feet traversed by the machine, or at any other regular distance for which it is adapted, but a removal of the pressure disengages the clutch which may be engaged at will and at any time by pressure upon the foot lever. In the drawings—

A represents the axle of the carriage of the reaping machine, to which, outside of the outer wheel of the carriage, an arm or wheel, B, is attached. The pitman C of the rake is attached to the face of said arm or wheel B by means of a wrist or fastening, D, which is adjustable in a slot of the wheel B so as to increase or diminish the length of the stroke or sweep of the rake. The rear end of the pitman C is attached to the rocking-arm F by a universal joint. The fulcrum of the arm F is adjustable, and is attached to the carriage by slot and bolt as represented, or in any other equivalent way or manner. The arm F is attached to the connecting-rod G by a universal joint, and the connecting-rod G is attached by a universal joint to a collar, H, which works in a groove cut in the box or slide I, near its outer end, and which embraces said box or slide in such manner as to permit said box or slide to revolve while the clasp remains in position. The universal joints above described permit the motions of the rake to be adapted to the inequalities of the surface over which the carriage and reaper may pass. The head of the rake J is attached to the inner end of said box or slide I. One end or arm of the head of said rake extends from said slide I forward over the platform of the reaper, and the prong $i$ on the other end extends from said slide or box I to the rear of the platform, which is so constructed with wood, iron, or any other hard or durable material, as to present a bearing, K, for said prong so as to keep the teeth of the rake on the platform when raking off. The box or slide I, by means of its attachment to the axle of the carriage as above described, is made to move back and forth, carrying the rake with it along the rear end of the platform on a curved rod, L, which is attached to the platform by means of fastenings at its ends. The curved rod is an important feature in our invention, as it causes the rake to assume the direction of the dividing-board of the platform to describe the arc of a circle on the platform, drawing the buts of the cut grain away from the guards and pitman of the reaper and delivering it entirely clear of the platform in bundles or sheaves, as above stated. Over the bearing K there is a bearing, M, which may be attached to the end of the platform as represented, or be extended above the bearing K the whole length of the platform. The bearing M prevents the forward end of the rake from falling below the level of the platform after it leaves the platform in delivering the sheaf or bundle, and keeps the rake in proper position to commence its return. Near the end of the bearing K there is a catch, N, the end or point of which by a spring is made to press against the bearing M. On said platform, and rising from it, in the form of inclined planes, at its outer end to the top of the bearing K, and at its inner end to the bearing M, are fastened two guides O O equidistant from each other, the lower surface or edge of said catch N and its connections with the platform forming the inclined plane of one of said guides, as shown in fig. 3. In delivering the sheaf the prong $j$ of the rake-head that extends to the bearing K passes over the catch N, and as the rake is returned after delivering the sheaf the prong is depressed by the inclined plane formed by said catch, and the rake-head is lifted to a vertical position, in which position it is held by said guides until it reaches the end of the platform next to the dividing-board, where it is again forced down upon the platform by the inclined plane formed by said guides, and is again in position to rake. Motion is given to said rake by means of a clutch, P, attached to the axle A inside of the wheel or arm B, which is operated upon by a shipper lever and connections which extend from the clutch to a point in the carriage convenient to the driver's foot or hand. When the pressure of the driver's foot or hand is removed from the connections of the shipper lever, the clutch is automatically thrown out of gear by means of a spring inserted in it. The platform has an overhanging reel, and is supported at the side by the usual grain-wheel, in the rear by a caster-wheel, P', and in front by the end of the drag-bar connected with a movable or adjustable socket, Q, to facilitate the elevation of the cutting apparatus. A loose tongue is attached to the carriage by a hinge bolt, R, convertible into a stiff tongue by passing a bolt vertically through it and fastened to said carriage.

Having described our invention, what we claim therein as new, and desire to secure by Letters Patent, is—

1. The attachment of the raking apparatus to an adjustable wrist on an exterior clutch-wheel on the outer end of the carriage axle, substantially as and for the purpose described.

2. We claim the arrangement of the pitman C, rocking-arm F, connecting-rod G, and clasp H, with universal joint connections, the pivotal point of the rocking-arm F being adjustable to vary the length of throw, substantially as described.

3. We claim the combination with the rear extension prong $j$ of the rake-head, of the curved rod L, the bearings K M, latch N, and platform guide $o\ o$, substantially as described.

JOHN F. HIRSCHY,
WM. M. McDONALD.

Witnesses:
GEORGE REX,
OHIO F. JONES.